United States Patent
Watanabe et al.

(10) Patent No.: US 10,499,674 B2
(45) Date of Patent: Dec. 10, 2019

(54) TAKOYAKI MIX

(71) Applicant: NISSHIN FOODS INC., Chiyoda-ku (JP)

(72) Inventors: Takenori Watanabe, Fujimino (JP); Tomoharu Makio, Fujimino (JP); Kanako Kawata, Fujimino (JP)

(73) Assignee: NISSHIN FOODS INC., Chiyoda-ku (JP)

( * ) Notice: Subject to any disclaimer, the term of this patent is extended or adjusted under 35 U.S.C. 154(b) by 570 days.

(21) Appl. No.: 15/103,739

(22) PCT Filed: Dec. 12, 2014

(86) PCT No.: PCT/JP2014/082930
§ 371 (c)(1),
(2) Date: Jun. 10, 2016

(87) PCT Pub. No.: WO2015/087992
PCT Pub. Date: Jun. 18, 2015

(65) Prior Publication Data
US 2016/0316801 A1    Nov. 3, 2016

(30) Foreign Application Priority Data
Dec. 13, 2013    (JP) .................................. 2013-258429

(51) Int. Cl.
*A23L 17/00*    (2016.01)
*A23L 29/212*   (2016.01)
*A23P 20/10*    (2016.01)
*A21D 10/04*    (2006.01)

(52) U.S. Cl.
CPC .............. *A23L 17/75* (2016.08); *A21D 10/04* (2013.01); *A23L 29/212* (2016.08); *A23P 20/10* (2016.08); *A23V 2002/00* (2013.01)

(58) Field of Classification Search
CPC ........ A23P 20/12; A23P 20/10; A23L 29/212; A23L 17/75; A23L 29/262; A21D 10/04; A23V 2002/00
See application file for complete search history.

(56) References Cited

U.S. PATENT DOCUMENTS

2004/0241289 A1   12/2004   Dal Santo et al.
2006/0210673 A1    9/2006   Petrofsky et al.

FOREIGN PATENT DOCUMENTS

| JP | 6-62813 A     | 3/1994  |
|----|---------------|---------|
| JP | 10-150957 A   | 6/1998  |
| JP | 2001-69903 A  | 3/2001  |
| JP | 2002-186468 A | 7/2002  |
| JP | 2002-355012 A | 12/2002 |
| JP | 2003-52341 A  | 2/2003  |
| JP | 2003-079346 A | 3/2003  |
| JP | 2003-265148 A | 9/2003  |
| JP | 2006-061046 A | 3/2006  |
| JP | 2007-148981 A | 6/2007  |
| JP | 2009-159821 A | 7/2009  |
| JP | 2013-85524 A  | 5/2013  |
| JP | 2013-252104 A | 12/2013 |

OTHER PUBLICATIONS

JP 2002355012 A (Dec. 10, 2002) English Abstract and Machine translation of description (Year: 2002).*
Office Action dated Jun. 26, 2018 in Japanese Patent Application No. 2015-552526 (with unedited computer generated English translation), 14 pages.
Nussinovitch, A. et al. "Cooking innovations. Using hydrocolloids for thickening, gelling, and emulsification", CRC Press, Jul. 11, 2013, pp. 77-99 (with four cover pages).
Japanese Office Action dated May 15, 2018 in Japanese Patent Application No. 2015-552526 (with partial English translation), 10 pages.
Tatsuya Ikuzawa, "Basic Physical Properties and Applications of Methylcellulose and HPMC", Food Chemical,11, pp. 63-67.
Konno, A., et al., "Gel Formation of Curdlan", Nippon Nogeikagaku Kaishi, vol. 52, No. 6,1978, pp. 247-250 (with English Abstract of p. 247).
Mika Iijima et al., "Thermal Properties of Thermoreversible Polysaccharide Hydrogels", Calorimetry and Thermal Analysis, 2007, vol. 34, No. 3, (pp. 104-112), (with partial English translation).
Tako M. et al., "Evidence for a conformational transition in curdlan", Polymer Gels and Networks, 1997, (pp. 241-250).
"METHOCEL Cellulose Ethers as Suspending Agents for Suspension Polymerization of Vinyl Chloride", The Dow Chemical Company, 1999 (Total 11 pages).
Masanori Cho, "The Sol-Gel Transition Temperature of Gelatin Solution", Sojo University Kenkyu Hokoku, 2006, vol. 31, No. 1, (with English abstract), (Total 3 pages).
International Search Report dated Feb. 24, 2015 for PCT/JP2014/082930 filed on Dec. 12, 2014.
Extended European Search Report dated Jun. 26, 2017 in Patent Application No. 14869810.3.
Amos Nussinovitch et al., "Chapter 5: Cellulose Derivatives", "Cooking innovations. Using hydrocolloids for thickening, gelling, and emulsification", CRC Press, XP002770938, Sep. 17, 2013, pp. 65-87.
Office Action dated Oct. 30, 2018 in Japanese Patent Application No. 2015-552526, 6 pages (with unedited computer generated English translation).

\* cited by examiner

*Primary Examiner* — Subbalakshmi Prakash
(74) *Attorney, Agent, or Firm* — Oblon, McClelland, Maier & Neustadt, L.L.P.

(57) ABSTRACT

Provided are takoyaki having a crisp texture on the surface and a soft and smooth texture inside and also having a high shape-retaining property. A takoyaki mix includes from 70 to 99.7% by mass of cereal flour and from 0.3 to 5.0% by mass of a thermo-reversible gelling agent that forms gel by an increase in temperature.

10 Claims, No Drawings

TAKOYAKI MIX

TECHNICAL FIELD

The present invention relates to a takoyaki mix and to takoyaki batter and takoyaki each made from the mix.

BACKGROUND ART

In general, takoyaki is a baked food prepared by heating a special pan with molds, pouring wheat flour-containing liquid batter into the heated pan, putting ingredients such as octopus and red pickled ginger into the batter, and baking the batter into balls. In recent years, frozen takoyaki has been on sale, which can be eaten after heating in a microwave oven. Popular takoyaki has a crisp baked surface and a soft, melty, creamy texture inside. Unfortunately, takoyaki with such a soft texture inside has a problem of a low shape-retaining property. Immediately after baking, takoyaki can maintain their unique ball shape because its surface is baked hard; however, its surface becomes soft with internal water migrating over time, to thereby lose the shape-retaining property and become dented or flattened. In addition, when takoyaki with such a soft texture inside is frozen and then heated in a microwave oven, it may entirely become soft immediately after heating and become dented or shrunk, which makes it impossible to obtain the unique appearance and texture of takoyaki sufficiently.

Some methods have been proposed for making takoyaki with a soft texture inside and a high shape-retaining property. Patent Literature 1 discloses that a baked food is produced using a mix including wheat flour and gelatin as essential ingredients. Patent Literature 2 discloses a takoyaki making method which includes adding a takoyaki modifier including a thickening stabilizer, such as gum, pectin or alginic acid, with an average particle size of 20 μm or less. Patent Literature 3 discloses a takoyaki making method which includes attaching a starch-containing dispersion on the surface of semi-baked takoyaki and then heating it.

CITATION LIST

Patent Literatures

Patent Literature 1: JP 2002-186468 A
Patent Literature 2: JP 2002-355012 A
Patent Literature 3: JP 2003-079346 A

SUMMARY OF INVENTION

Technical Problem

The present invention is directed to a provision of takoyaki that has a crisp texture on surface yet a soft and melty texture inside and can retain its unique ball shape not only immediately after baking but also after a lapse of time from baking or after preserving by freezing, for example, and then reheating.

Solution to Problem

The inventors have found that takoyaki having a high shape-retaining property and also having a crisp texture on the surface and a soft and smooth texture inside can be made from a material containing a specific amount of a thermo-reversible gelling agent that forms gel by an increase in temperature.

Specifically, the present invention provides a takoyaki mix including from 70 to 99.7% by mass of cereal flour and from 0.3 to 5.0% by mass of a thermo-reversible gelling agent that forms gel by an increase in temperature.

The present invention also provides a method of producing a takoyaki mix, the method including mixing from 70 to 99.7% by mass of cereal flour and from 0.3 to 5.0% by mass of a thermo-reversible gelling agent that forms gel by an increase in temperature.

The present invention also provides takoyaki batter containing the takoyaki mix.

The present invention also provides a method of producing takoyaki, the method including baking the takoyaki batter.

Advantageous Effects of Invention

The present invention makes it possible to provide takoyaki having a property to retain highly its unique ball shape not only immediately after baking but also after a lapse of time from baking or after preserving by freezing, for example, and reheating and also having a crisp texture on the surface and a soft and melty texture inside.

DESCRIPTION OF EMBODIMENTS

The takoyaki mix of the present invention includes cereal flour as a main ingredient. The cereal flour is not particularly limiter as long as it is a flour based on wheat flour. Preferred is a flour containing 50% by mass or more of wheat flour in the total mass of the cereal flour. Examples of wheat flour include soft flour, moderate flour, whole wheat flour, semi-hard flour, hard flour, extra high-protein flour, durum wheat flour, and durum semolina flour. Among them, soft flour and moderate flour are preferred, and soft flour is more preferred. Examples of the cereal flour other than wheat flour include rye flour, triticale flour, and rice flour. The examples of the cereal flour listed above may be used alone or in any combination. The content of the cereal flour in the takoyaki mix of the present invention is preferably from 70 to 99.7% by mass, more preferably from 70 to 90% by mass, based on the total mass of the mix.

The takoyaki mix of the present invention contains a thermo-reversible gelling agent that forms gel by an increase in temperature. As used herein, the term "thermo-reversible gelling agent that forms gel by an increase in temperature" refers to a gelling agent that undergoes reversible sol-gel transition, i.e., forming gel at high temperatures and forming sol at low temperatures. The thermo-reversible gelling agent that forms gel by an increase in temperature for use in the present invention may be of any edible type, typical examples of which include methyl cellulose (MC), hydroxypropyl methylcellulose (HPMC), curdlan, and a mixture of any of these. The thermo-reversible gelling agent that forms gel by an increase in temperature for use in the present invention preferably has a sol-gel transition temperature of from 38 to 90° C., more preferably from 55 to 90° C., even more preferably from 60 to 80° C., further more preferably from 60 to 70° C. When the sol-gel transition temperature of the gelling agent is low, the resulting takoyaki tends to lose the soft and melty texture inside. MC and HPMC with a sol-gel transition temperature in the above ranges are commercially available. More preferred examples of the thermo-reversible gelling agent that forms gel by an increase in temperature for use in the present invention include MC with a sol-gel transition temperature of from about 38 to about 55° C., HPMC with a sol-gel transition temperature of from about 55 to about 90° C., and a mixture thereof.

The sol-gel transition temperature in the description can be measured by differential scanning calorimetry.

The content of the thermo-reversible gelling agent that forms gel by an increase in temperature in the takoyaki mix of the present invention is preferably from 0.3 to 5% by mass, more preferably from 0.6 to 1.6% by mass, even more preferably from 0.6 to 1.0% by mass, based on the total mass of the mix. The shape-retaining property of the resulting takoyaki may be low if the content of the thermo-reversible gelling agent that forms gel by an increase in temperature is too low. On the other hand, the resulting takoyaki may have an unfavorable viscous texture if the content is too high.

The takoyaki mix of the present invention may further contain a starch in addition to the cereal flour and the thermo-reversible gelling agent that forms gel by an increase in temperature. The addition of a starch can further improve the texture of the resulting takoyaki. Examples of the starch include starches commonly used in takoyaki and other baked foods, such as tapioca starch, potato starch, wheat starch, corn starch, and waxy corn starch; modified starches obtained by subjecting these starches to physical processing or chemical processing such as acetylation, hydroxypropylation, etherification, crosslinking, oxidation, or gelatinization; and a mixtures thereof. The content of the starch in the takoyaki mix of the present invention is preferably from 0.5 to 5% by mass, more preferably from 1 to 3.2% by mass, based on the total mass of the mix.

Besides the materials listed above, the takoyaki mix of the present invention may further contain any appropriate additional material used for conventional takoyaki mixes. Examples of such an additional material include saccharides, salt, flavor enhancer (monosodium glutamate), plant protein (such as soy flour or wheat protein), egg powder, yam powder, dried fish shavings (such as dried bonito, dried mackerel, dried frigate mackerel, small dried sardine, and dried tuna shavings), kelp powder, thickeners (exclusive of the thermo-reversible gelling agent that forms gel by an increase in temperature), spices, extracts and soup preparations, dried ingredients such as dried vegetables, and powdered oil or fat. From a viewpoint of not compromising the effects of the present invention, the total content of the additional materials in the takoyaki mix of the present invention is preferably 20% by mass or less based on the total mass of the mix.

The takoyaki mix of the present invention can be produced by appropriately mixing the cereal flour and the thermo-reversible gelling agent that forms gel by an increase in temperature, and optionally the starch and any additional material. The takoyaki mix of the present invention may be in any form, such as a powder or granules.

The takoyaki mix of the present invention may also be provided in a form of batter. The takoyaki batter, which contains the takoyaki mix of the present invention, may be prepared by adding a liquid such as water or liquid seasoning and other ingredients such as seafood to the mix of the present invention and mixing them. The amount of water in the takoyaki batter is preferably adjusted so that the batter has a suitable consistency for cooking, taking into account the amount of oil or fat and egg added, which are described below. For example, the amount of water in the batter may be appropriately adjusted in a range of from 200 to 600 parts by mass based on 100 parts by mass of the takoyaki mix of the present invention.

Oil or fat is preferably added to the takoyaki batter, because the resulting takoyaki can have more improved melty texture inside. Examples of the oil or fat include vegetable and animal liquid oils or fats with a melting point of 23° C. or less commonly used in food products, such as soybean oil, olive oil, palm oil, palm kernel oil, coconut oil, corn oil, cotton seed oil, rape seed oil, sunflower oil, and fish oil. Soybean oil, corn oil, and cotton seed oil are preferred from a viewpoint of improving flavor. The use of oil or fat with a melting point of higher than 23° C. may make the texture inside of takoyaki firm. As used herein, the term "the melting point of oil or fat" means the open capillary melting point measured according to The Japan Oil Chemists' Society (JOCS) Standard Methods for the Analysis of Fats, Oils and Related Materials (2.2.4.2-1996). The amount of the oil or fat in the takoyaki batter is preferably from 6 to 40 parts by mass, more preferably from 18 to 32 parts by mass, based on 100 parts by mass of the takoyaki mix of the present invention.

The takoyaki batter may further contain egg. The addition of egg can further improve the fluffy texture inside of takoyaki. The egg may be used in a form of liquid egg (such as whole egg, egg yolk, or egg white). The amount of the egg in the takoyaki batter is preferably from 12 to 75 parts by mass, more preferably from 30 to 63 parts by mass, based on 100 parts by mass of the takoyaki mix of the present invention.

The takoyaki batter containing the takoyaki mix of the present invention can be produced by baking according to a common procedure. The resulting takoyaki may be eaten immediately after baking, eaten after cooling as appropriate, or eaten after preserving by refrigeration or freezing and then thawing or re-heating, for example, using a microwave oven or deep-frying. When frozen takoyaki is thawed or reheated and eaten, the frozen takoyaki may be preserved in a refrigerator for thawing from the day before eating and then re-heated on the day of eating, for example, using a microwave oven or deep-frying. When the produced takoyaki is preserved by freezing, it may be subjected to slow or rapid freezing. In view of the shape-retaining property, rapid freezing is preferred. In the case of rapid freezing, the takoyaki is preferably frozen with cold air at −20° C. or lower, more preferably at −30° C. or lower, even more preferably at −35° C. or lower immediately after baking.

EXAMPLES

Hereinafter, the present invention will be more specifically described with reference to examples. It will be understood that the examples are not intended to limit the present invention.

Preparation Examples 1 to 19

Each takoyaki mix was prepared by mixing materials shown in Table 1 below. Takoyaki batter was prepared by adding, to 16 parts by mass of the resulting takoyaki mix, 63 parts by mass of water, 6 parts by mass of beaten egg, 1 part by mass of soy sauce, 3 parts by mass of chopped red pickled ginger, and 11 parts by mass of shredded cabbage and stirring them. The takoyaki batter was poured into a takoyaki pan heated at 190° C., to which tempura scraps and chopped pieces of octopus were added. When the part of the batter in contact with the takoyaki pan began to bake, the batter was turned upside down. The batter was then baked until entirely cooked through, so that takoyaki balls were obtained.

Test Example 1

The resulting takoyaki balls were placed on a dish and allowed to stand at room temperature for 30 minutes.

Subsequently, 10 panels evaluated the appearance and texture of the takoyaki balls based on the evaluation criteria shown in Table 2. The "denting ratio" was used as a criterion for the evaluation of the appearance. The denting ratio is the value calculated from the formula below based on the results of measurements in which the takoyaki balls were placed on a dish immediately after baking and 30 minutes after baking, respectively, and then measured for height from the dish to the top of the takoyaki balls.

Denting ratio={1−(the height of the takoyaki balls after 30-minute standing)/(the height of the takoyaki balls immediately after baking)}×100

Table 1 shows the evaluation results.

TABLE 1

| Takoyaki mix formulation | | Production Example | | | | | | | | | |
|---|---|---|---|---|---|---|---|---|---|---|---|
| (mass parts) | | 1 | 2 | 3 | 4 | 5 | 6 | 7 | 8 | 9 | 10 |
| | Soft flour | 16.00 | 15.99 | 15.99 | 15.95 | 15.90 | 15.90 | 15.75 | 15.20 | 15.10 | 15.10 |
| Thermo-reversible gelling agent that forms gel by an increase in temperature (gelling transition temperature) | HPMC*1 (70-90° C.) | — | 0.01 | — | — | — | 0.1 | — | — | 0.9 | — |
| | HPMC*1 (62-68° C.) | — | — | 0.01 | 0.05 | 0.1 | — | 0.25 | 0.8 | — | 0.9 |
| | HPMC*2 (55-75° C.) | — | — | — | — | — | — | — | — | — | — |
| | MC*3 (50-55° C.) | — | — | — | — | — | — | — | — | — | — |
| | MC*3 (38-44° C.) | — | — | — | — | — | — | — | — | — | — |
| | Gelling agent content (mass % in mix) | 0 | 0.063 | 0.063 | 0.31 | 0.63 | 0.63 | 1.56 | 5.0 | 5.63 | 5.63 |
| Appearance of takoyaki | | 1.3 | 2.5 | 2.6 | 3.9 | 4.5 | 4.2 | 4.6 | 4.7 | 4.7 | 4.7 |
| Texture of takoyaki | | 3.7 | 3.6 | 3.6 | 3.6 | 3.4 | 3.5 | 3.2 | 3.1 | 1.3 | 1.2 |

| Takoyaki mix formulation | | Production Example | | | | | | | | |
|---|---|---|---|---|---|---|---|---|---|---|
| (mass parts) | | 11 | 12 | 13 | 14 | 15 | 16 | 17 | 18 | 19 |
| | Soft flour | 15.90 | 15.90 | 15.90 | 15.75 | 15.75 | 15.75 | 15.75 | 15.90 | 15.90 |
| Thermo-reversible gelling agent that form gel by an increase in temperature (gelling transition temperature) | HPMC*1 (70-90° C.) | — | — | — | — | 0.25 | — | — | — | — |
| | HPMC*1 (62-68° C.) | 0.05 | — | — | — | — | — | — | — | — |
| | HPMC*2 (55-75° C.) | — | 0.1 | — | — | — | — | — | — | — |
| | MC*3 (50-55° C.) | 0.05 | — | 0.1 | — | — | 0.25 | — | — | — |
| | MC*3 (38-44° C.) | — | — | — | 0.1 | — | — | 0.25 | — | — |
| | Gelling agent content (mass % in mix) | 0.63 | 0.63 | 0.63 | 0.63 | 1.56 | 1.56 | 1.56 | — | — |
| | Xanthan gum*4 | — | — | — | — | — | — | — | 0.1 | — |
| | Guar gum*5 | — | — | — | — | — | — | — | — | 0.1 |
| Appearance of takoyaki | | 4.5 | 4.3 | 4.4 | 4.4 | 4.4 | 4.6 | 4.7 | 2.3 | 2.2 |
| Texture of takoyaki | | 3.2 | 3.3 | 3.0 | 2.8 | 3.4 | 2.9 | 2.7 | 2.4 | 2.4 |

*1 Hydroxypropyl methylcellulose (Unitec Foods Co., Ltd.)
*2 Hydroxypropyl methylcellulose (Shin-Etsu Chemical Co., Ltd.)
*3 Methyl cellulose (Unitec Foods Co., Ltd.)
*4 SAN-ACE (San-Ei Gen F.F.I., Inc.)
*5 GUAPAC (DSP GOKYO FOOD & CHEMICAL Co., Ltd.)

TABLE 2

| Score | Evaluation criteria |
|---|---|
| Appearance | |
| 5 | A perfect ball-shape with a denting ratio of less than 5%. |
| 4 | An almost perfect ball-shape with a denting ratio of 5% or more and less than 10%. |
| 3 | A denting ratio of 10% or more and less than 20%. |
| 2 | Losing a ball-shape with a denting ratio of 20% or more and less than 30%. |
| 1 | Losing a ball-shape with a denting ratio of 30% or more. |
| Texture | |
| 5 | The surface is crisp, and the inside has a fluffy and melty texture sufficiently. |
| 4 | The surface is crisp, and the inside has a fluffy and melty texture. |
| 3 | The surface is crisp, and the inside has a fluffy and melty texture slightly. |
| 2 | The surface is crisp; however, the inside has a fluffy and melty texture insufficiently. |
| 1 | The surface is crisp; however, the inside has no fluffy and melty texture. |

Test Example 2

A takoyaki mix was prepared using the same procedure as in Production Example 5, except that a starch was added in the amount shown in Table 3 below to the mix, and then takoyaki balls were prepared using the resulting mix. The resulting takoyaki balls were evaluated based on the same criteria as in Test Example 1. Table 3 shows the results. Table 3 also shows the results of Production Example 5.

TABLE 3

| Takoyaki mix formulation | Production Example | | | | | | | |
|---|---|---|---|---|---|---|---|---|
| (mass parts) | 5 | 20 | 21 | 22 | 23 | 24 | 25 | 26 |
| Soft flour | 15.90 | 15.85 | 15.80 | 15.70 | 15.40 | 15.10 | 14.90 | 15.70 |
| HPMC*1 (gelling transition temperature 62-68° C.) | 0.1 | 0.1 | 0.1 | 0.1 | 0.1 | 0.1 | 0.1 | 0.1 |

TABLE 3-continued

| Takoyaki mix formulation (mass parts) | Production Example | | | | | | | |
|---|---|---|---|---|---|---|---|---|
| | 5 | 20 | 21 | 22 | 23 | 24 | 25 | 26 |
| Thermo-reversible gelling agent content (mass % in mix) | 0.63 | 0.63 | 0.63 | 0.63 | 0.63 | 0.63 | 0.63 | 0.63 |
| Modified starch*2 | — | 0.05 | 0.1 | 0.2 | 0.5 | 0.8 | 1.0 | — |
| Starch*3 | — | — | — | — | — | — | — | 0.2 |
| Starch/modified starch content (mass % in mix) | — | 0.31 | 0.63 | 1.25 | 3.1 | 5.0 | 6.25 | 1.25 |
| Appearance of takoyaki | 4.5 | 4.5 | 4.5 | 4.5 | 4.5 | 4.5 | 4.6 | 4.5 |
| Texture of takoyaki | 3.4 | 3.4 | 3.7 | 3.8 | 3.7 | 3.6 | 3.1 | 3.7 |

*1 Hydroxypropyl methylcellulose (Unitec Foods Co., Ltd.)
*2 Oxidized potato starch
*3 Potato starch

Test Example 3

A takoyaki mix was prepared using the same procedure as in Production Example 26, and takoyaki balls were prepared using the resulting mix. As an exception to the procedure, an oil or fat in the amount shown in Table 4 below was substituted for part of the water to be added to the mix. The resulting takoyaki balls were evaluated based on the same criteria as in Test Example 1.

Table 4 shows the results. Table 4 also shows the results of Production Example 26. The results in Table 4 show that the addition of an oil or fat with a low melting point to the takoyaki batter allows the resulting takoyaki balls to have a good texture whereas the shape-retaining property of the takoyaki balls decreases as the amount of the oil or fat added increases.

TABLE 4

| Takoyaki batter formulation (mass parts) | Production Example | | | | | | | | | |
|---|---|---|---|---|---|---|---|---|---|---|
| | 26 | 27 | 28 | 29 | 30 | 31 | 32 | 33 | 34 | 35 |
| Soft flour | 15.70 | 15.70 | 15.70 | 15.70 | 15.70 | 15.70 | 15.70 | 15.70 | 15.70 | 15.70 |
| HPMC*1 (gelling transition temperature 62-68° C.) | 0.1 | 0.1 | 0.1 | 0.1 | 0.1 | 0.1 | 0.1 | 0.1 | 0.1 | 0.1 |
| Thermo-reversible gelling agent content (mass % in mix) | 0.63 | 0.63 | 0.63 | 0.63 | 0.63 | 0.63 | 0.63 | 0.63 | 0.63 | 0.63 |
| Starch*2 | 0.2 | 0.2 | 0.2 | 0.2 | 0.2 | 0.2 | 0.2 | 0.2 | 0.2 | 0.2 |
| Starch or modified starch content (mass % in mix) | 1.25 | 1.25 | 1.25 | 1.25 | 1.25 | 1.25 | 1.25 | 1.25 | 1.25 | 1.25 |
| Soybean oil*3 | — | 0.5 | 1 | 3 | 5 | 6 | 7 | — | 2.5 | — |
| Corn oil*4 | — | — | — | — | — | — | — | 5 | 2.5 | — |
| Lard*5 | — | — | — | — | — | — | — | — | — | 5 |
| Amount of X oil added (mass parts based on 100 mass parts of mix) | 0 | 3.1 | 6.3 | 18.8 | 31.3 | 37.5 | 43.8 | 31.3 | 31.3 | 31.3 |
| Beaten egg | 6 | 6 | 6 | 6 | 6 | 6 | 6 | 6 | 6 | 6 |
| Water | 63 | 62.5 | 62 | 60 | 58 | 57 | 56 | 58 | 58 | 58 |
| Appearance of takoyaki | 4.5 | 4.6 | 4.8 | 4.6 | 4.3 | 3.7 | 2.8 | 4.3 | 4.3 | 4.2 |
| Texture of takoyaki | 3.7 | 3.5 | 3.9 | 4.5 | 4.7 | 4.8 | 4.9 | 4.8 | 4.7 | 3.3 |

*1 Hydroxypropyl methylcellulose (Unitec Foods Co., Ltd.)
*2 Potato starch
*3 Melting point −5° C.
*4 Melting point −12° C.
*5 Melting point 33° C.

Test Example 4

A takoyaki mix was prepared using the same procedure as in Production Example 29, and takoyaki balls were prepared using the resulting mix. As an exception to the procedure, egg was added in the amount shown in Table 5 below to the mix (the total amount of water, oil or fat, and egg was 69 parts by mass relative to 16 parts by mass of the takoyaki mix). The resulting takoyaki balls were evaluated based on the same criteria as in Test Example 1.

Table 5 shows the results. Table 5 also shows the results of Production Example 29. The results in Table 5 show that the outer shape-retaining property of the appearance decreases when the amount of egg added to the mix decreases whereas the texture is degraded when the amount of egg increases.

TABLE 5

| Takoyaki batter formulation | Production Example | | | | | | |
|---|---|---|---|---|---|---|---|
| (mass parts) | 36 | 37 | 38 | 29 | 39 | 40 | 41 |
| Mix | 16.0 | 16.0 | 16.0 | 16.0 | 16.0 | 16.0 | 16.0 |
| Beaten egg | 1 | 2 | 5 | 6 | 10 | 12 | 13 |
| Amount of egg added (mass parts based on 100 mass parts of mix) | 6.25 | 12.5 | 31.3 | 37.5 | 62.5 | 75 | 81.3 |
| Soybean oil | 3 | 3 | 3 | 3 | 3 | 3 | 3 |
| Water | 65 | 64 | 61 | 60 | 56 | 54 | 53 |
| Appearance of takoyaki | 2.8 | 4.0 | 4.4 | 4.6 | 4.7 | 4.8 | 4.8 |
| Texture of takoyaki | 4.5 | 4.6 | 4.5 | 4.5 | 4.2 | 3.8 | 3.1 |

Test Example 5

A takoyaki mix was prepared using the same procedure as in Production Example 29. Takoyaki balls were prepared using the resulting mix and then immediately frozen in a freezer at the temperature shown in Table 6 below. After freezing, the takoyaki balls were preserved at −20° C. for 24 hours and then re-heated by deep-frying at 180° C. for 5 minutes. The takoyaki balls were allowed to stand at room temperature for 30 minutes and then evaluated for appearance and texture based on the same criteria as in Test Example 1.

Table 6 shows the results. Table 6 also shows the results of Production Example 29 (without freezing and re-heating). The results in Table 6 show that when the freezing temperature is −20° C. or lower, the degradation of the appearance or texture after thawing can be reduced.

TABLE 6

| Takoyaki batter formulation | Production Example | | | | | |
|---|---|---|---|---|---|---|
| (mass parts) | 29 | 42 | 43 | 44 | 45 | 46 |
| Mix | 16.0 | 16.0 | 16.0 | 16.0 | 16.0 | 16.0 |
| Whole egg | 6 | 6 | 6 | 6 | 6 | 6 |
| Soybean oil | 3 | 3 | 3 | 3 | 3 | 3 |
| Water | 60 | 60 | 60 | 60 | 60 | 60 |
| Freezing temperature (° C.) | Without freezing | −10 | −20 | −30 | −35 | −40 |
| Appearance of takoyaki | 4.6 | 2.7 | 4.0 | 4.2 | 4.3 | 4.5 |
| Texture of takoyaki | 4.5 | 3.3 | 3.8 | 4.0 | 4.2 | 4.4 |

The invention claimed is:

1. A takoyaki mix, comprising:
   70 to 99.7% by mass of cereal flour;
   0.3 to 5.0% by mass of a thermo-reversible gelling agent that forms gel by an increase in temperature, and
   0.63 to 5% by mass of a starch,
   wherein said thermo-reversible gelling agent is hydroxypropyl methylcellulose having a sol-gel transition temperature of from 55 to 90° C.

2. The takoyaki mix according to claim 1, comprising: from 1 to 3.2% by mass of said starch.

3. A method of producing the takoyaki mix according to claim 1, the method comprising mixing said cereal flour, said thermo-reversible gelling agent, and said starch.

4. A takoyaki batter, comprising the takoyaki mix according to claim 1.

5. The takoyaki batter according to claim 4, further comprising from 6 to 40 parts by mass of an oil or fat based on 100 parts by mass of the takoyaki mix.

6. The takoyaki batter according to claim 4, further comprising from 12 to 75 parts by mass of egg based on 100 parts by mass of the takoyaki mix.

7. A method of producing takoyaki, the method comprising baking the takoyaki batter according to claim 4.

8. The takoyaki mix according to claim 1, comprising 0.6 to 1.6% by mass of said thereto-reversible gelling agent.

9. The takoyaki mix according to claim 1, comprising 0.6 to 1.0% by mass of said thereto-reversible gelling agent.

10. The takoyaki mix according to claim 2, comprising 0.6 to 1.0% by mass of said thermo-reversible gelling agent.

* * * * *